United States Patent
Covino

(10) Patent No.: US 6,871,830 B2
(45) Date of Patent: Mar. 29, 2005

(54) THERMAL-SPRAYED TOOLING

(75) Inventor: Charles P. Covino, Far Hills, NJ (US)

(73) Assignee: GMIC, Corp., Linden, NJ (US)

( * ) Notice: Subject to any disclaimer, the term of this patent is extended or adjusted under 35 U.S.C. 154(b) by 354 days.

(21) Appl. No.: 10/167,116

(22) Filed: Jun. 11, 2002

(65) Prior Publication Data

US 2002/0150645 A1 Oct. 17, 2002

Related U.S. Application Data

(62) Division of application No. 09/577,712, filed on May 23, 2000, now Pat. No. 6,447,704.

(51) Int. Cl.[7] .............................................. B29C 33/38
(52) U.S. Cl. ...................................... 249/135; 249/139
(58) Field of Search ................................. 249/135, 139

(56) References Cited

U.S. PATENT DOCUMENTS

| | | |
|---|---|---|
| 2,410,888 A * | 11/1946 | Lucy .......................... 264/219 |
| 3,631,745 A | 1/1972 | Walkey et al. |
| 3,638,299 A | 2/1972 | Garner et al. |
| 4,197,902 A | 4/1980 | Von Jan et al. |
| 4,231,982 A | 11/1980 | Jansson |
| 4,398,693 A * | 8/1983 | Hahn et al. .................. 249/155 |
| 4,549,597 A * | 10/1985 | Hamamura ................... 164/35 |
| 4,726,412 A | 2/1988 | Magnan et al. |
| 4,814,126 A * | 3/1989 | Krueger ...................... 264/45.1 |
| 5,073,589 A | 12/1991 | Milovich et al. |
| 5,079,974 A | 1/1992 | Weiss et al. |
| 5,296,178 A | 3/1994 | Sugihara et al. |
| 5,658,506 A | 8/1997 | White et al. |
| 5,746,966 A | 5/1998 | McDonald |
| 5,817,267 A | 10/1998 | Covino et al. |
| 5,875,830 A | 3/1999 | Singer et al. |

\* cited by examiner

*Primary Examiner*—Allan R. Kuhns
(74) *Attorney, Agent, or Firm*—Lerner, David, Littenberg, Krumholz & Mentlik, LLP

(57) ABSTRACT

A metallic shell used, for example as a mold, is formed by spray deposition connected to a base by rods or other supports connected to mounting elements which are incorporated in the shell during the deposition process. The shell can incorporate different metals to provide different thermal conductivity in various regions.

7 Claims, 4 Drawing Sheets

THERMAL-SPRAYED TOOLING

CROSS REFERENCE TO RELATED APPLICATIONS

The present application is a divisional of U.S. patent application Ser. No. 09/577,712, filed on May 23, 2000 now. U.S. Pat. No. 6,447,704, the disclosure of which is hereby incorporated by reference herein.

FIELD OF THE INVENTION

The present invention relates to tools such as molds fabricated by thermal spraying of metals.

BACKGROUND OF THE INVENTION

Industrial processes such as molding and lay up of composite materials, thermoforming, injection molding and reaction injection molding require tools having a shape specific to the article to be made. For example, a composite article can be formed in a mold having a shape corresponding to the shape of the desired article by laying up fibers and a matrix composition such as an epoxy or other polymeric material on the surface of the mold and curing the polymer composition. In some cases, the fibers and composition are held between two mating mold parts so that the fibers and composition are squeezed between the surfaces of the mold parts. In reaction injection molding, two or more mating mold parts are brought together to form a substantially closed cavity and a reactive polymer composition is placed within the cavity and cured to form a shape corresponding to the shape of the cavity. Tools for forming small parts are often machined from solid metals or cast using conventional techniques. These techniques are impractical in the case of very large molds, such as those having dimensions of about a meter (about three feet) or more.

There has been an ever-increasing need for large molds in numerous industries. For example, in the aerospace industry, the increasing prevalence of composite structural materials in airframes has lead to a substantial need for practical large molds. These molds must meet demanding conditions in use. Composite parts used in airframes must meet exacting standards for fit and finish and often incorporate complex curved surfaces. Also, many useful materials such as carbon-fiber reinforced graphite composites must be molded at relatively high temperatures. Molds formed from alloys having low coefficients of thermal expansion such as nickel alloys are preferred for bonding these materials. The cost of machining very large molds from solid blocks of these materials is prohibitive.

As described in greater detail in commonly assigned U.S. Pat. No. 5,817,267 ("the '267 patent"), the disclosure of which is hereby incorporated by reference herein, molds and other tools of essentially unlimited dimensions may be formed from a wide variety of metals, including low-expansion nickel and iron alloys by a thermal spraying process. As described in certain embodiments of the '267 patent, a shell have a working surface with a desired shape can be formed by providing a matrix having the desired shape and spraying droplets of molten metal using a thermal spray gun such as a plasma spray gun or arc spray gun onto the matrix. Such spraying can be used to build up the metal to a substantial thickness, typically about one-quarter inch (6 mm) or more. During the deposition process, the spray gun is moved relative to the matrix so that the spray gun passes back and forth over the surface of the matrix in a movement direction and so that the spray gun shifts in a step direction transverse to the movement direction between passes. The metal is ejected from the gun in a spray direction. The gun is turned between passes so as to change the spray direction between passes. Thus, during at least some successive passes, metal is deposited on the same region of the matrix from two different spray directions in a "crisscross" pattern. The resulting shells have substantial strength and good conformity with the matrix to provide a faithful reproduction of the matrix shape. Although the '267 patent is not limited by any theory of operation, it is believed that deposition of the metal in different spray directions can produce an interwoven pattern of metal droplets and/or metal grains in the deposited shell, and that this produces a stronger, generally better shell.

As also described in the '267 patent, the shell can be strengthened by applying a backing material such as a polymeric reinforcement on the surface of the shell opposite from the working surface. Typically, such reinforcement can include additional structural elements such as metallic members, and may also include elements such as cooling and heating tubes for conducting a fluid to heat or cool the mold in service. Molds of this type provide practical, low-expansion large molds and accordingly have been widely adopted in diverse industries including the aerospace industry.

Other spray-metal mold making processes have also been proposed. Typically, these involve formation of molds from a relatively low-melting, low-strength materials such as zinc.

Despite the success of the molds and processes disclosed in the '267 patent, still further improvement would be desirable. In particular, there has been a need for improved ways of mounting and supporting the shells formed by thermal spraying. The mounting and reinforcing structure should support the shell at many locations on the shell. The need for such support is particularly great in the case of very large molds, where the weight of the shell, the weight of the materials placed in the shell during a molding process, and the pressure applied to the molding composition during the molding process all can cause deformation of the mold. The process to fabricate the support should be simple and economical and should not cause deformation or destruction of the shell. The support should be relatively light to facilitate handling of the mold during use and during shipment. For example, in some composite and thermal set molding processes, a mold is charged with the composition to be molded at a lay-up or filling station and then moved into a curing station such as a large autoclave or oven. Minimizing the weight of the support minimizes the difficulties in handling the filled mold during these steps. Moreover, the processes to provide and attach the support should not unduly complicate the spraying process used to fabricate the shell. All of these factors, taken together, have presented a significant engineering challenge.

Further enhancement in the thermal properties of sprayed molds also would be desirable. In various molding processes heat is transferred between the molding composition inside the mold and heating or cooling elements such as fluid conduits, electrical resistance heaters or the like in thermal contact with the shell. Such heat transfer can be used either to heat or cool the molding composition as required by the particular process. In some cases, local heat transfer problems limit the production rate and the part quality. For example, parts having diverse geometric features such as curves, corners and the like, and parts having relatively thin sections and relatively thick sections, do not cure uniformly. A relatively thick section of the part may be only partially cured when a relatively thin section has already been fully cured. This limits the rate at which parts can be formed in the mold and can cause product defects such as warpage. It would be desirable to provide sprayed shell molds which can help to alleviate these problems.

SUMMARY OF THE INVENTION

The present invention, in its various aspects, addresses these diverse problems.

One aspect of the invention provides methods of fabricating a mold. The method in accordance with this aspect of the invention preferably includes the step of spray-depositing an inner layer of a metal on a matrix so that said inner layer has an working surface conforming to said matrix and an exterior surface facing away from the matrix. A plurality of mounting elements are secured in place on the inner layer. Most preferably, an outer layer of a metal is spray-deposited over the inner layer so that said outer layer merges with said inner layer to form an integral shell having said mounting elements embedded therein. The mounting elements desirably are connected to a base so that said shell is at least partially supported on said base by said mounting elements.

The steps of securing said mounting elements in place on said inner layer and spray-depositing the outer layer most preferably are performed so that said at least some of the mounting elements have portions disposed between the inner layer and the outer layer. Thus, each mounting element may have a main section extending in a first direction, and one or more retainer sections projecting from the main section at the inner end. The step of securing the mounting elements in place desirably is performed so that the retainer sections overlie the exterior surface of said inner layer, and the step of spray-depositing the outer layer can be performed so that the retainer sections are disposed between said inner layer and said outer layer. Although the layers are referred to herein as separate layers for ease of understanding, it should be appreciated that the spray deposition process forms these layers into a unitary, integral shell, with the mounting elements firmly fixed in position.

The rods and base form a strong, light-weight assembly which provides support at numerous locations on the shell. Desirably, the rods are connected to the base by adjustable attachments which can make secure connections between the rods and base despite deviations in the positioning of the rods. Thus, the rods can be engaged with the mounting elements and base even if the mounting elements are not placed with extreme precision. The entire assembly can be fabricated economically, using simple techniques.

Another aspect of the invention provides a method of making a mold comprising the steps of spray-depositing a metal onto a matrix so as to form a shell having an working surface conforming to the shape of the matrix and an exterior surface facing away from the matrix. According to this aspect of the invention, the composition of the deposited metal is varied during the spray-depositing step so as to deposit different metals, most preferably metals of different thermal conductivities, in different regions of the shell. For example, a shell may include wall sections formed from a relatively low-conductivity metal such as aluminum and a high-conductivity metal such as copper to provide better heat transfer in certain areas. Such a mold can provide more uniform curing of the molded article. The high-conductivity metal can provide good heat transfer even in areas where it is difficult to place heat transfer elements such as cooling or heating fluid conduits. Heat transfer elements may be embedded in the shell itself, by placing the heat transfer elements onto the shell during the deposition process and depositing a further layer of metal over the heat transfer elements.

Further aspects of the invention provide molds and mold components incorporating structural elements as mentioned above in connection with the methods.

These and other objects, features and advantages of the present invention will be more readily apparent from the detailed description of the preferred embodiments set forth below.

DETAILED DESCRIPTION OF THE PREFERRED EMBODIMENTS

Figure 1:
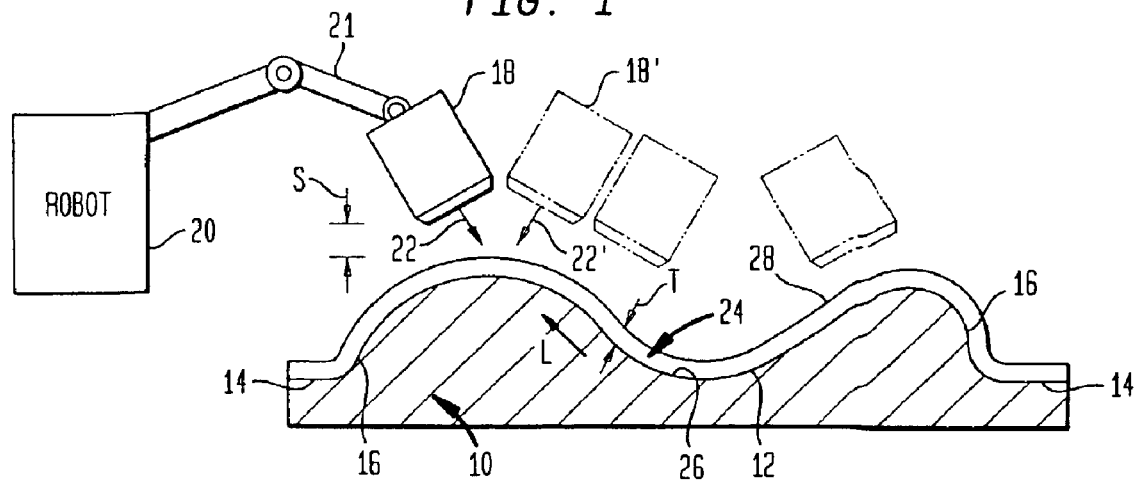
FIG. 1 is a diagrammatic partially sectional view depicting one stage during formation of a mold in accordance with one embodiment of the invention.
Figure 2:
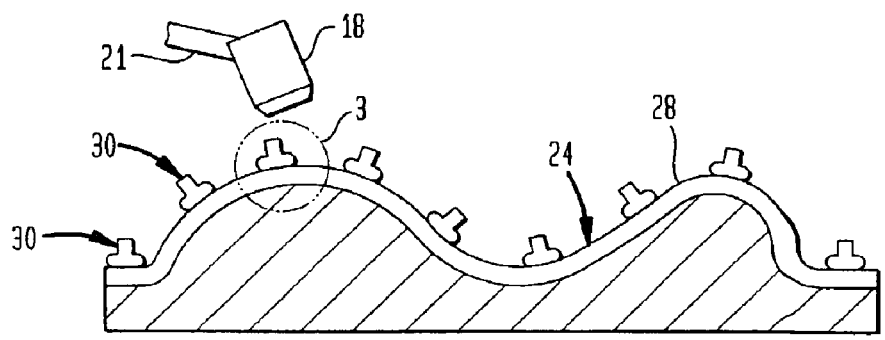
FIG. 2 is a view similar to FIG. 1 but depicting the mold during a later stage of the process.

A process in accordance with one embodiment of the invention uses a matrix 10 having an active surface 12 with a shape corresponding to the shape of the part to be molded. As described in greater detail in the '267 patent, the matrix desirably also includes edge regions 14 projecting outwardly from the active surface and side walls 16 extending between the edge regions and active surface 12. The matrix 10 can be formed from essentially from any material having useful structural strength at the temperatures attained by the matrix during application of the sprayed metal, typically on the order of 220° F. (104° C.). The matrix can be formed by any conventional process. For example, high-temperature epoxy composite tooling compounds can be cast to shape using a master tool (not shown). Readily machinable materials such as polymeric materials, metals such as aluminum or brass and graphite may be machined to shape using conventional methods such as numerically controlled machining methods to form the matrix. Although the matrix is depicted as a solid, unitary body, it may incorporate internal structures such as hollow spaces, reinforcing members such as metal bars or fibers and the like. Also, the matrix typically is supported on a supporting structure such as a table or machine bed.

A thermal spray gun 18 linked to a conventional industrial robot 20 is used to apply molten metal to the matrix. The thermal spray gun 18 may be a conventional plasma spray gun or arc spray gun. For example, a typical spray gun such as that sold under the designation Model BP400 Arc Spray System by Miller Thermal, Inc. of Appleton, Wis. is arranged to apply an electrical potential to strike an arc between a pair of wires and to feed the wires continually into the arc while blowing a stream of a compressed gas through the arc. The stream carries a spray of metal droplets formed from the molten wire at a high velocity in a relatively narrow pattern extending from the front of the gun so that the droplets move principally in a spray direction 22. The sprayed metal droplets impinge on the active surface 12 of matrix 10 and deposit as an inner layer 24 having a working surface 26 conforming to the shape of the active surface 12, wall 16 and edge regions 14 of the matrix. The first layer 24 has a thickness direction T generally normal to the working surface 26 and hence normal to the active surface of the matrix. The layer also has lateral directions L transverse to the thickness direction and hence generally parallel to the working surface 26. Thus, the lateral directions of the layer 24 (and of the formed shell as a whole) are the directions generally to the left and right and generally into and out of the plane of the drawing in FIG. 1.

A non-oxidizing gas such as nitrogen may be used as the gas in spraying and may be applied as a gas blanket over the area being sprayed. The use of such a non-oxidizing blanket minimizes oxidation of the metal during the process and promotes bonding of newly-sprayed metal to previously-sprayed metal.

The robot maintains spray head 18 at a preselected standoff distance or spacing S from the matrix and from the deposited layer. The standoff distance will depend upon the spray conditions and the particular head employed, but most typically is about 10 to 15 centimeters, i.e., about 4–6 inches. As the metal is sprayed from head 18, robot 20 moves the head in a sweeping pattern over the active surface 12 and the adjacent walls and edge regions of the matrix. Desirably, the robot moves head 18 in a movement direction as, for example, into and out of the plane of the drawing as seen in FIG. 1 and shifts the head in a step direction transverse to the movement direction (to the left and right in FIG. 1) between passes. The robot also turns head 18 to different directions so as to change the spray direction between passes. For example, while the head 18 is in the orientation depicted in solid lines in FIG. 1, the spray direction 22 is generally to the right as seen in FIG. 1. While the head is in the orientation shown in broken lines at 18' in FIG. 1, the spray direction 22' is generally to the left. As described in greater detail in the '267 patent, the movement of the head and turning of the head to different orientations are controlled so that metal impinges on each area of the matrix in two or more different spray directions, typically in different directions during alternate passes of the head. Although the '267 patent and the present invention are not limited by any theory of operation, it is believed that the deposited metal droplets solidify to form an interwoven pattern of elongated and tapering metallic grains. Regardless of the mechanism of operation, spraying so as to deposit metal with different orientations and lengths forms a superior metal shell capable of greater tensile strength.

The material used to form first or inner layer 24 is selected for compatibility with the material to be molded. Particularly in those applications involving elevated temperatures or substantial temperature changes during the molding operation, the material used to form the first layer is selected to have a low coefficient of thermal expansion and to provide substantial strength at elevated temperature. Merely by way of example, materials such as aluminum alloys, ferrous metal such as stainless steels and iron-nickel alloys can be used. Alloys formed predominantly from iron and nickel are particularly preferred for this purpose. As used in this disclosure, a metal formed "predominantly from" certain metals contains at least about 50% of those metals in the aggregate. Thus, a metal formed predominantly from iron and nickel contains at least about 50% iron and nickel in the aggregate and 50% or less of other materials by weight. Alloys of iron and nickel containing between about 30% and about 55% nickel and between about 45% and about 70% iron are particularly preferred. The most preferred low-expansion alloys are those containing about 36% nickel.

Figure 3:
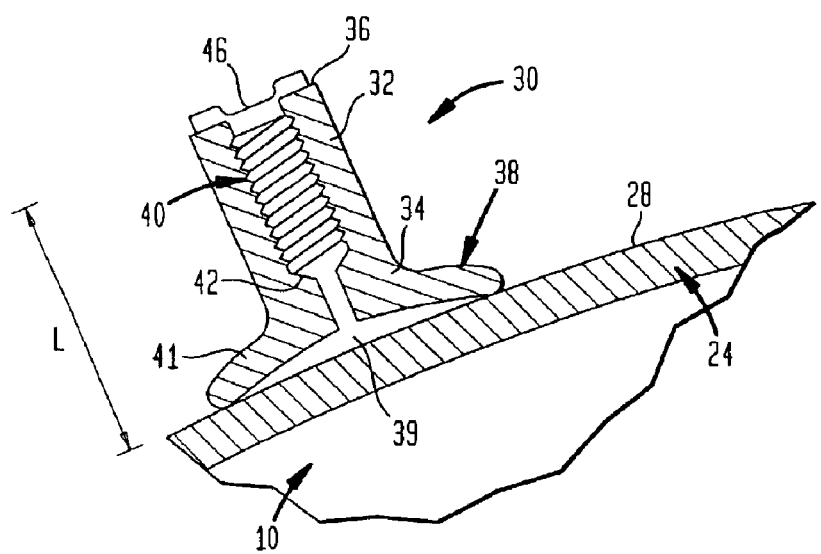
FIG. 3 is a fragmentary, diagrammatic sectional view on an enlarged scale depicting the region indicated in FIG. 2.
Figure 4:
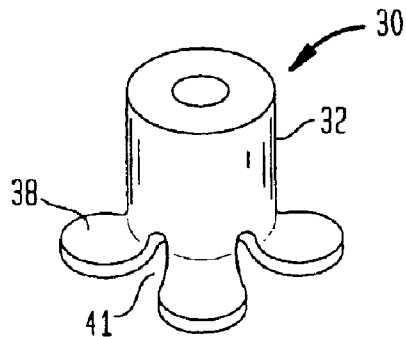
FIG. 4 is a diagrammatic perspective view of an element used in the mold of FIGS. 2 and 3.

After the first layer 24 has been deposited, a set of mounting elements are secured to the outer surface 28 of the first layer 24. As best seen in FIG. 3, each mounting element 30 has an elongated main portion 32 defining an inner end 34 and an outer end 36. Each mounting element also has a shallow conical or dish-shaped retainer section 38 at the inner end 34 of the main section defining a generally concave inner surface 39. As best seen in FIG. 4, retainer section 38 has a series of radial slots extending towards and away from main section 32 and subdividing the retainer section into a set of individual sections or legs. The retainer section 38 projects from the main section in directions transverse to the inward and outward directions defined by the main section, i.e., in directions transverse to the axis of the main section. The concave side of the retainer section faces inwardly (toward the bottom as seen in FIG. 3).

Each mounting element has a bore 40 extending in the inward and outward directions within the main section 32. Bore 40 is internally threaded. The inner end 42 of each such bore may extend through the retainer section to the concave face 39 The total length L of each mounting element desirably is less than about 6 inches (15 cm) and most typically about 2 inches to about 5 inches. As further discussed below, this length should be less than the standoff distance used in spray-depositing subsequent layers. Each mounting element is secured in place on the exterior surface of first layer 24 by spot welding it to the first layer. The welds need only be strong enough to hold the mounting element on the exterior surface during deposition of the second layer as discussed below. The mounting elements may be formed from essentially any metal which can be successfully welded with the material used to form the first layer.

The mounting elements are placed at intervals over the entire outer surface 28 of the first layer. The distance between adjacent mounting elements need not be uniform over the entire layer. For example, the mounting elements may be placed at closer intervals in areas of the mold which require relatively strong support as, for example, regions which will be subjected to large loads in service, and at relatively large intervals in regions which will not be subjected to large loads in service. Most commonly, the mounting elements are provided at intervals of about 8 to 14 inches (about 20–36 cm).

Extreme precision in placement of the mounting elements is not required. As further discussed below, other elements compensate for minor deviations in placement of the mounting elements. Typically, placement of the mounting elements within +/-¼ inch (6 mm) of the intended location is sufficiently precise.

Each mounting element is provided with a temporary plug 46 closing bore 40 at the outer end. The temporary plug typically is formed from a rubber or polymer and is press-fit into the internal threads of the bore. Alternatively, the temporary plug may be threadedly engaged within the bore. The temporary plug does not project significantly from the outer end 36 of the main section.

Figure 6:
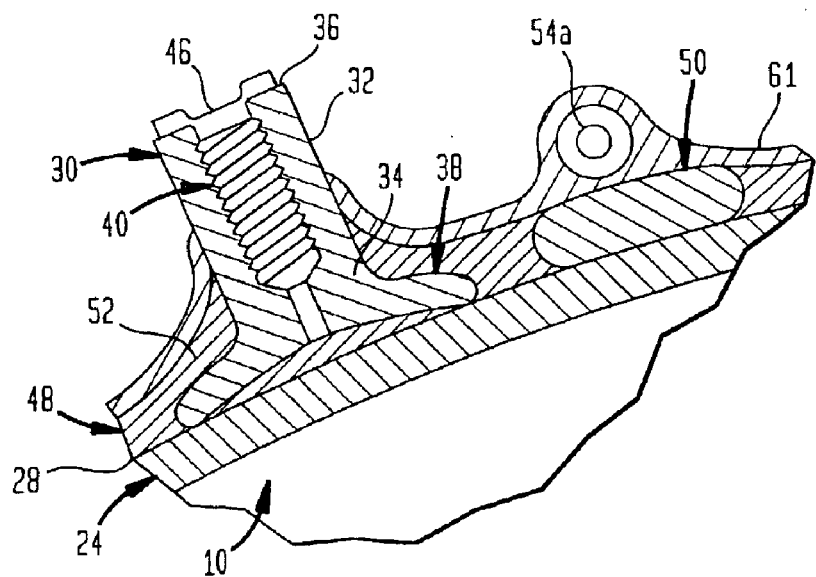
FIG. 6 is a fragmentary, diagrammatic sectional view on an enlarged scale depicting the region indicated in FIG. 5.

After the mounting elements 30 have been secured on the exterior surface of the first layer, a second layer 48 including one or more metals is spray-deposited onto the outer surface 28 of the first layer and onto at least the retainer sections 38 of the mounting elements. The second layer may be formed by spray-depositing in substantially the same manner as the first layer. During this spray-depositing step, the spray head 18 and associated elements such as the robot arm 21 supporting the spray head pass over the outer surface of the first layer at the desired standoff distance. However, the mounting elements do not interfere with the spray head. Provided that the length of the mounting elements, and hence the height of the mounting elements above the outer surface 28, are less than the standoff distance, the spray head can pass over the mounting elements without difficulty. Although the second layer 48 and first layer 24 are depicted in FIG. 6 as separate layers for clarity of illustration, it should be appreciated that the second layer merges with the first layer 24 and forms a unitary shell. The second layer covers the securement sections 38 of the mounting elements and leaves the securement sections as well as the inner ends 34 of the main sections 32 from the embedded in the unitary shell. Some metal may be deposited on the outer ends 36 of the mounting elements. However, the temporary plugs 46 prevent this metal from entering bores 40 and prevent this metal from contaminating the threads within the bores.

The second layer need not have uniform composition. Thus, the second layer 48 may include a first metal constituting most of the second layer and regions 50 formed from a second, different metal. Preferably, the second metal used to form regions 50 has a different thermal conductivity than the first metal. For example, where the first metal used to form the majority of second layer 48 is predominantly formed from metals such as iron, nickel and aluminum, the second metal may consist predominantly of copper. Regions of differing composition may be formed by varying the composition of the metal supplied to the spray head during the deposition process. Typically, a substantial thickness of one metal is deposited first in those regions where that metal is desired and then the other metal is deposited over the remainder of the exterior surface. Here again, although the regions 50 of the second metal are illustrated separately from the remainder of layer 48, it should be appreciated that the spray deposition process merges the metals into a unitary body.

Regions 50 of relatively high conductivity metal can be incorporated in the sprayed shell to provided extra thermal conductivity in certain regions of the mold. The particular regions where additional thermal conductivity is desired will depend upon the molding process and the configuration of the part. Typically, these regions are spaced apart from one another along the lateral directions of the shell. Also, the amount of high conductivity metal incorporated in each region will be selected to provide the desired difference in thermal conductivity. Thus, the second metal may extend entirely through the thickness of the second layer or may form only a portion of the thickness in those regions where the second metal is present.

One or more additional layers 52 may be provided on the exterior surface of the second layer in a similar manner. Here again, the additional layers 52 merge with the previously-deposited layers so that all of the layers together constitute a unitary shell.

Figure 5:
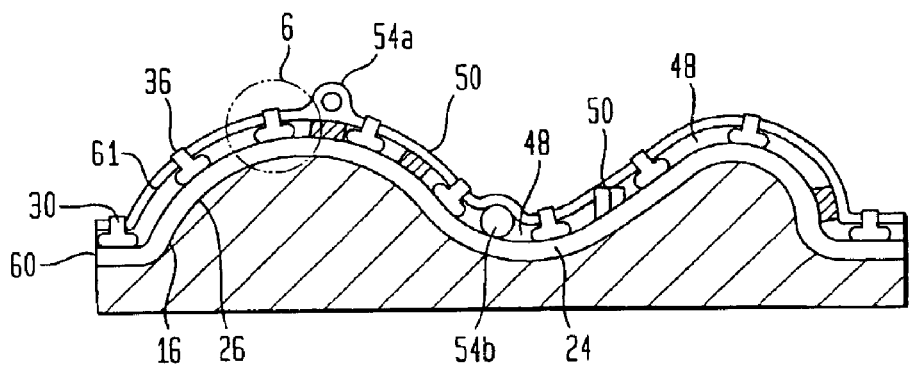
FIG. 5 is a view similar to FIGS. 1 and 2 but depicting the mold at a still later stage in the process.

Heating or cooling elements such as conduits 54 for a heating or cooling fluid, thermal resistance heaters and the like may also be incorporated in the shell. Preferably, the heating or cooling elements are placed onto the exposed surface of a layer before the next layer is sprayed. A conduit or elongated electrical resistance heating element can be bent to shape. Typically, the conduit is formed into a number of turns or windings configured to provide the desired heat transfer from various regions of the mold in service. The conduit may be held in place by fasteners, tack welds or the like if necessary to retain it during the spraying process. For example, one run of a conduit 54A (FIG. 6) is tacked in place on second layer 48 before the third layer 52 is spray-deposited. The spray-deposited third layers embeds the conduit in the unitary shell so that the conduit is firmly retained in position and is in intimate, heat transfer contact with the shell. Conduit 54B (FIG. 5) has been fastened to the first layer 24 prior to deposition of second layer 48 and is likewise embedded in the shell. Although only a few conduits are illustrated in FIG. 5, it should be appreciated that in practice it shall incorporate numerous runs of conduit, which may be continuous with one another or separate from one another. Also, in actual practice, all of the conduit typically is embedded between the same layers. Thus, all of the conduit in an actual mold typically would be embedded between the first layer and the second or between the second layer and a subsequent layer.

The end result of the spray-depositing steps is to form an integral, unitary shell 60, incorporating the metal deposited in all of the various layers, with mounting elements 30 embedded therein and with the outer ends 36 of the mounting elements exposed on the exterior surface 61 of the shell. The shell has a working surface 26 corresponding to the interior surface of layer 24 and conforming to the shape of matrix 10. As described in greater detail in the '267 patent, the shell can be allowed to cool gradually, desirably over a period of several hours and preferably over a longer time before being removed from the matrix. For example, very large molds may be cooled from about 150° C. to about 20° C. over a period of several weeks in a temperature controlled environment with subsequent cooling at normal room temperature. It is believed that such gradual cooling tends to stabilize the shell and prevent warpage when the shell is removed from the matrix. As also described in the '267 patent, those portions of the shell extending along the side walls 16 of the matrix form ribs projecting from the remainder of the shell which further tend to stiffen the shell and reinforce it against warpage. Those ribs may remain in place in the finished shell or else may be removed after cooling.

Before or after removal of the shell from the matrix, the shell is mounted to a base 62 by a set of rods 64 connecting the mounting elements 30 with the base. Larger shells typically are connected to the base before removal from the matrix. Smaller shells typically are connected to the base after removal from the matrix. Base 62 may be formed from any material which provides substantial structural support. Preferably, base 62 is formed as a framework of steel or other suitable structural metal. Conventional structural elements such as I-beams and angle iron can be used to fabricate base 62. Base 62 may incorporate features which facilitate movement and handling of the assembled base and shell as, for example, wheels 66 or features which can be engaged by a crane or forklift.

Figure 8:
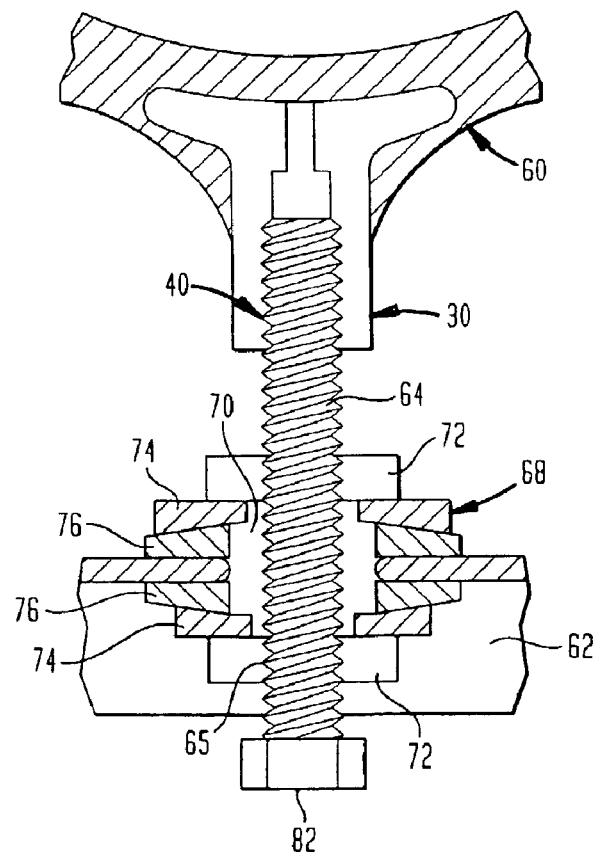
FIG. 8 is a diagrammatic sectional view on an enlarged scale of the region indicated in FIG. 7.

As best seen in FIG. 8, each rod 64 is a conventional bolt or other elongated threaded element. Each rod 64 is threadedly engaged in the bore 40 of one of the mounting elements. Each rod 64 is also connected to base 62 through an adjustable attachment 68. The rod is threadedly engaged with the adjustable attachment 68. Attachment 68 is configured so that it can engage the rod and connect the rod to the base even wherein the location of the outer end 65 of the rod 64 deviates from its intended position and even if the angle between the rod and the base deviates from the intended angle to some extent.

Figure 7:
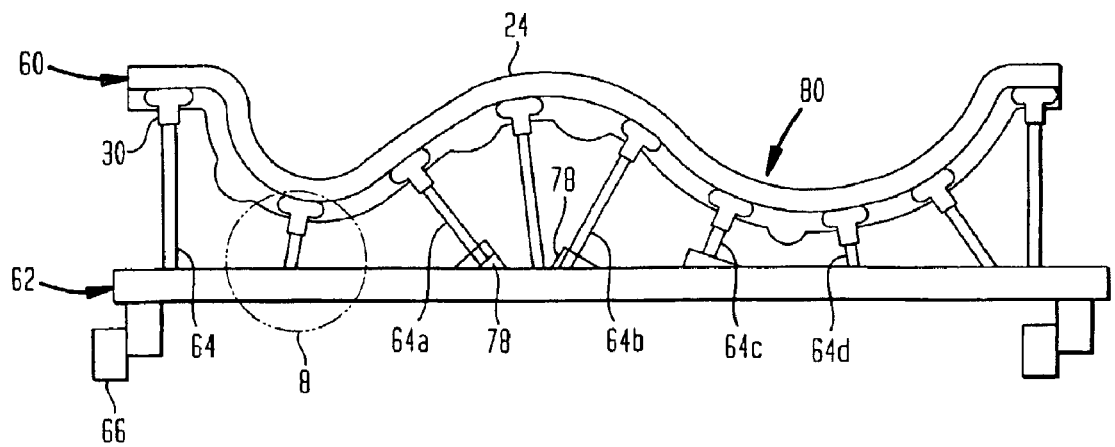
FIG. 7 is a diagrammatic elevational view of the mold shown in FIGS. 1–6 assembled with a base.

Essentially any type of adjustable attachment which accommodates tolerances in disposition of the rod can be employed. In the particular form of adjustable attachment depicted in FIG. 8 for illustrative purposes, the outer end 65 of each rod projects through a hole 70 in a structural element of base 62. Hole 70 is substantially larger diameter than rod 65, so that the rod can pass through the hole even if the rod deviates from its intended disposition. The mounting includes a pair of nuts 72 threadedly engaged with the rod on opposite sides of the structural element. A set of washers 74 and 76 having mating spherical surfaces is provided between each nut 72 and the structural element 62, so that one such set is disposed on each side of the structural element. These washers have flat sides disposed against the nuts and against the structural element 62. Thus, by tightening the nuts against the washer, the outer end of the rod can be firmly fixed against the structural element even if the rod is not perpendicular to the surfaces of the structural element. The base 62 may incorporate structural elements such as bracket 78 (FIG. 7) to provide mounting surfaces which are more nearly perpendicular to the nominal directions of certain rods 64.

The range of adjustability in position and angle provided by the adjustable mounting greatly reduces the need for precision in placement of mounting elements 30 during fabrication of the shell.

Assembly of the rods and base to the shell desirably is performed so that the shell is not accidentally distorted by forces applied during the assembly process. Preferably, while the shell is supported on the matrix or on another element which helps to retain the shell in shape, and while the base is supported by temporary supports (not shown) the various threaded connections can be hand-tightened. Then, each threaded connection is further tightened by a small increment and this process is repeated so that the various threaded connections reach full tightness at approximately the same time. The shape of the shell can be checked during the tightening process and the individual rods may be adjusted to deliberately distort the shell back to the desired shape. For example, if measurements during tightening indicate that the region 80 of the shell 60 supported by rods 64C and 64D has sagged downwardly, the rods 64C and 64D can be turned so as to force this section of the mold upwardly relative to the base and relative to the remainder of the shell, and thus deform the shell back to its desired shape.

After the rod tightening process has been completed, excess portions of the rods can be cut off. For example, each rod 64 may be provided as a conventional elongated bolt having a head 82 to facilitate the tightening process. These heads and any portions of the rods projecting beyond support 62 can be cut off after completion of the tightening process. Conventional measures used to prevent loosening of threaded connections may be used. For example, lock nuts, lock washers, and other mechanical devices can be used to prevent loosening of the threaded connections between the rods and the mounting elements 30 and to prevent loosening of the threaded connection between the rods and the adjustable mountings 68. Adhesives such as anaerobic compounds may be introduced into the threaded connections. Once the rods have been fully tightened the shell 60 is firmly fixed to the base. The assembly can be handled and moved as a unit. The rods and mounting elements provide support to the shell at various locations distributed over the lateral dimensions of the shell. Therefore, the shell is effectively reinforced against distortion by the weight of the shell or by pressure exerted on the working surface 24 of the shell.

The completed assembly can be used as a mold or a mold component. For example, in reaction injection molding or blow molding, two such assemblies can be engaged with one another so that their shells form a closed cavity and a molten composition can be squeezed between the shells. In other processes such as thermoforming and some lay up processes, only one shell is employed.

Numerous variations and combinations of the features discussed above can be employed without departing from the present invention. Merely by way of example, other types of adjustable connections between the rods and the base may be employed. Also, it is not essential to provide adjustable attachments for all of the rods. One or more rods may be provided with conventional threaded connections as, for example, holes directly tapped in the structural elements of support 62. If sufficient care is taken in placement of the mounting elements 30, non-adjustable attachments can be used for all of the rods. Moreover, deliberate deformation of a shell by adjustment of the supporting structure can be employed with other types of supporting structures.

Figure 9:
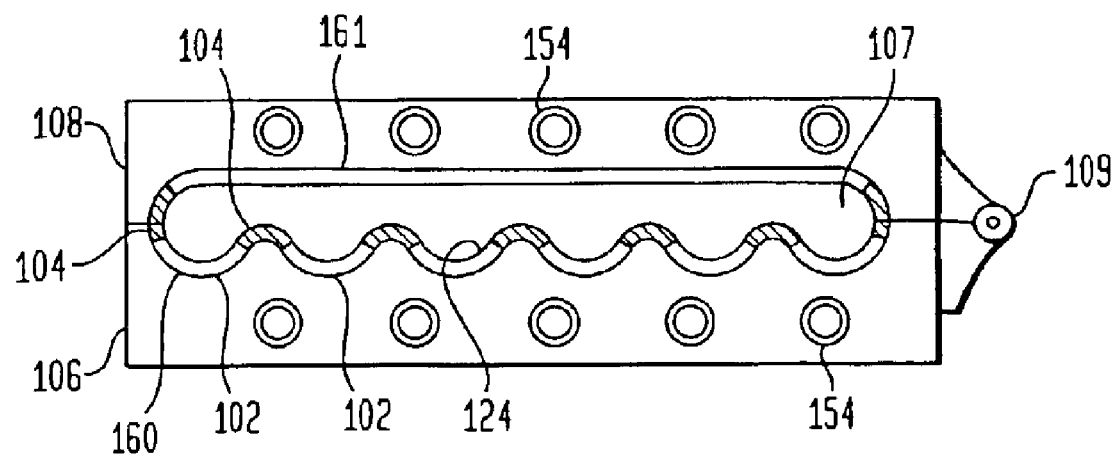
FIG. 9 is a diagrammatic sectional view of a mold in accordance with a further embodiment of the invention.

Also, a multi-metal sprayed mold shell can be employed without the particular mounting elements and support discussed above. For example, the mold depicted in FIG. 9 includes a single layer shell 160 having regions of first metal 102 and a second metal 104 disposed at various locations along the lateral extent of its working surface 124. Such a single layer shell can be formed by the processes discussed above. In this case, the two distinct metals extend to the working surface 124 of the shell and come into contact with the material to be formed. Shell 160 is supported by a solid backing 106 having heat transfer elements such as fluid conduit 154 embedded therein. Such a solid backing may be a metallic backing cast in place on the exterior surface of the shell. Alternatively, such a solid backing may be provided as an additional layer of the shell itself. In the mold of FIG. 9, relatively high-conductivity second metal is provided at regions of the shell where the configuration of the shell makes it difficult to provide heat transfer elements 154. Thus, high-conductivity second metal 104 is disposed at ribs or projections on the shell. The mold of FIG. 10 has a second shell 161 generally similar to shell 160, and a second backing 108 with heat transfer elements 154. The backing elements of the two shells are connected as by a hinge 109 or other conventional elements so that they cooperatively define a closed cavity 107 for receiving a molding composition. Such a mold can be used, for example, in processes such as reaction injection molding, blow molding or the like.

As described in the '267 patent, the mold surfaces can be polished or otherwise treated to provide the desired surface finish. Also, the shells formed by thermal spraying may be porous or may be dense and substantially non-porous, depending upon the spray deposition conditions. The working surfaces of the shells may be impregnated with a polymer or with a metal such as nickel by electroplating or electroless plating. Polymeric coatings such as homopolymers and copolymers of tetrachlorethylene, flouranated ethylene propylene, perofluoro alkoxyethylene, acrylics, vinylidene fluorides and amides can be applied by conventional coating and impregnation techniques to enhance the release properties of the mold and to decrease its porosity. Surface treatments such as those sold under the registered trademarks TUFRAM and NEDOX, release agents such as those sold under the registered trademark PLASMADIZE and coatings such as those sold under the registered trademark LECTROFLUOR, all available from the General Magnatite Corporation of Linden, N.J. may be applied on the working surfaces of the shells.

As these and other variations and combinations of the features discussed can be utilized without departing from the present invention, the foregone description of the preferred embodiments should be taken by way of illustration rather than by way of limitation of the claimed invention.

What is claimed is:

1. A mold comprising:
   (a) a shell formed from a sprayed metal, said shell having a working surface conforming to the configuration of a part to be molded and having an exterior surface;
   (b) a plurality of mounting elements embedded in said shell at spaced-apart locations;
   (c) rods secured to said mounting elements and projecting therefrom; and
   (d) a base connected to said rods and supporting said shell through said rods.

2. A mold as claimed in claim 1 wherein each said mounting element has a main section extending in a first direction and defining an inner end and an outer end, and a one or more retainer sections projecting from said main section transverse to said first direction, said retainer sections being disposed within the metal of said shell, between said working and exterior surfaces.

3. A mold as claimed in claim 1 wherein each said mounting element has a bore therein and said rods are received in the bores of said mounting elements.

4. A mold as claimed in claim 3 wherein said bores are threaded and said rods are threadedly engaged in said bores of said mounting elements.

5. A mold as claimed in claim 4 further comprising adjustable attachment elements adjustably mounted on said base, said rods being threadedly engaged with said adjustable attachment elements.

6. A mold as claimed in claim 1 further comprising adjustable attachment means elements adjustably mounted on said base or said rods, at least some of said rods being connected to said base by said adjustable attachment elements, so that said adjustable attachment elements compensate for tolerances in the disposition of said rods.

7. A mold as claimed in claim 1 wherein said working surface has an area of about 1 m2 or more.

* * * * *

UNITED STATES PATENT AND TRADEMARK OFFICE
CERTIFICATE OF CORRECTION

PATENT NO. : 6,871,830 B2
DATED : March 29, 2005
INVENTOR(S) : Charles P. Covino It is certified that error appears in the above-identified patent and that said Letters Patent is hereby corrected as shown below:

Column 3,
Line 14, "so that said" should read -- so that the --.
Line 15, "has an" should read -- has a --.
Line 15, "conforming to said" should read -- conforming to the --.
Line 53, "an", should read -- a --.

Column 6,
Line 30, after "39" insert -- . --.

Column 8,
Line 10, "layers" should read -- layer --.

Column 9,
Line 35, after "(not shown)" insert -- , --.

Column 11,
Line 23, delete "a".

Column 12,
Line 22, "1 m2", should read -- $1m^2$ --.

Signed and Sealed this

Twelfth Day of July, 2005

JON W. DUDAS
*Director of the United States Patent and Trademark Office*